United States Patent
Arai et al.

(10) Patent No.: US 11,348,619 B2
(45) Date of Patent: May 31, 2022

(54) DUAL GASKET FOR MANUFACTURING OF HERMETICALLY-SEALED HARD DISK DRIVE

(71) Applicant: Western Digital Technologies, Inc., San Jose, CA (US)

(72) Inventors: Yuichi Arai, Kawasaki (JP); Miki Namihisa, Fujisawa (JP); Hiroshi Matsuda, Yokohama (JP); Takashi Tomita, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,031

(22) Filed: Feb. 16, 2021

(65) Prior Publication Data

US 2022/0020399 A1     Jan. 20, 2022

Related U.S. Application Data

(60) Provisional application No. 63/114,347, filed on Nov. 16, 2020, provisional application No. 63/052,888, filed on Jul. 16, 2020.

(51) Int. Cl.
    *G11B 33/14*         (2006.01)
    *G11B 25/04*         (2006.01)

(52) U.S. Cl.
    CPC ........ *G11B 33/1466* (2013.01); *G11B 25/043* (2013.01); *G11B 33/148* (2013.01)

(58) Field of Classification Search
    CPC .. G11B 33/1466; G11B 33/148; G11B 25/043
    See application file for complete search history.

(56) References Cited

U.S. PATENT DOCUMENTS

| | | | | |
|---|---|---|---|---|
| 5,916,671 A | * | 6/1999 | Dauber | C08J 9/32 |
| | | | | 428/317.3 |
| 7,218,473 B2 | * | 5/2007 | Bernett | G11B 33/1466 |
| | | | | 29/603.03 |

(Continued)

FOREIGN PATENT DOCUMENTS

WO     WO2013010497 A1     1/2013

OTHER PUBLICATIONS

Agilent Technologies, Inc., Advancements in Helium Leak Detection for Disk Drive Manufacturing, www.agilent.com/chem/vacuum, Jul. 11, 2011, 4 pages, Agilent Technologies, USA, downloaded at https://www.agilent.com/cs/library/technicaloverviews/public/HDD_TechOverview_JMcLaren_7-8-11%20(2).pdf.

*Primary Examiner* — Brian E Miller
(74) *Attorney, Agent, or Firm* — John D. Henkhaus

(57) ABSTRACT

A hard disk drive (HDD) includes an enclosure base, a first cover coupled to the base, and two separate gasket seals composed of different materials and configured to seal the interface between the first cover and the base. One gasket seal is composed of a material having a low permeability to helium or another lighter-than-air gas contained within the HDD, and the other gasket seal is composed of material having a low water vapor or moisture transmission. By using two separate independent gaskets which have different attributes, helium concentration is kept high and humidity is kept low during manufacturing testing, prior to affixing a hermetic second cover over the first cover, and degradation of HDD performance due to change of flying height is ultimately avoided.

16 Claims, 4 Drawing Sheets

(56) References Cited

U.S. PATENT DOCUMENTS

| | | | |
|---|---|---|---|
| 7,692,891 B2 * | 4/2010 | Hatchett | G11B 33/1466 360/99.21 |
| 7,986,490 B2 | 7/2011 | Hirono et al. | |
| 8,014,167 B2 * | 9/2011 | Gunderson | G11B 33/1466 361/800 |
| 8,248,724 B2 * | 8/2012 | Hayakawa | G11B 25/043 360/97.22 |
| 8,351,150 B2 * | 1/2013 | Chan | G11B 33/148 360/99.22 |
| 8,934,194 B2 | 1/2015 | Schreck | |
| 9,001,458 B1 * | 4/2015 | Vitikkate | G11B 33/1446 360/97.22 |
| 9,508,393 B1 | 11/2016 | Le et al. | |
| 9,818,454 B1 * | 11/2017 | Albrecht | G11B 33/1466 |
| 9,852,777 B2 * | 12/2017 | Albrecht | G11B 33/1466 |
| 10,679,680 B2 * | 6/2020 | Fitzgerald | G11B 33/027 |
| 10,699,753 B2 | 6/2020 | Lee et al. | |
| 2003/0179489 A1 * | 9/2003 | Bernett | G11B 33/1466 360/97.22 |
| 2004/0012880 A1 * | 1/2004 | Unno | G11B 33/1446 360/99.22 |
| 2004/0099987 A1 * | 5/2004 | Imai | B29C 48/12 264/177.1 |
| 2005/0180044 A1 * | 8/2005 | Lee | G11B 25/043 360/97.12 |
| 2005/0205279 A1 * | 9/2005 | Cochrane | H05K 9/002 174/355 |
| 2005/0264926 A1 * | 12/2005 | Burts-Cooper | G11B 33/121 360/97.22 |
| 2005/0286163 A1 * | 12/2005 | Kim | G11B 33/08 360/97.2 |
| 2007/0183085 A1 * | 8/2007 | Hatchett | G11B 33/1466 360/99.21 |
| 2007/0183086 A1 * | 8/2007 | Hatchett | G11B 25/043 360/99.21 |
| 2007/0183088 A1 * | 8/2007 | Hatchett | G11B 33/1466 360/99.21 |
| 2008/0150240 A1 * | 6/2008 | Isono | F16J 15/025 277/650 |
| 2009/0296271 A1 | 12/2009 | Feliss et al. | |
| 2014/0368948 A1 * | 12/2014 | Okutani | G11B 33/1446 360/97.12 |
| 2016/0104515 A1 * | 4/2016 | Strange | G11B 33/027 360/99.18 |
| 2017/0236557 A1 * | 8/2017 | Albrecht | G11B 25/043 360/97.12 |
| 2018/0047430 A1 * | 2/2018 | Albrecht | G11B 33/027 |
| 2018/0374509 A1 * | 12/2018 | Amin-Shahidi | G11B 33/125 |

* cited by examiner

POSITION A FIRST GASKET SEAL COMPOSED OF A FIRST MATERIAL OVER A SEALING STEP SURFACE OF SIDEWALLS OF AN ENCLOSURE BASE
402

POSITION A SECOND GASKET SEAL COMPOSED OF A SECOND MATERIAL OVER THE SEALING STEP SURFACE ADJACENT TO THE FIRST GASKET SEAL, WHEREIN THE FIRST MATERIAL IS A DIFFERENT MATERIAL THAN THE SECOND MATERIAL
404

AFFIX A FIRST COVER TO THE BASE, THEREBY SANDWICHING THE FIRST GASKET SEAL AND THE SECOND GASKET SEAL BETWEEN THE FIRST COVER AND THE SEALING STEP SURFACE
406

FIG. 4A

POSITION A FIRST GASKET SEAL COMPOSED OF A FIRST MATERIAL OVER A SEALING STEP SURFACE OF SIDEWALLS OF AN ENCLOSURE BASE
412

AFFIX A FIRST COVER TO THE BASE, THEREBY SANDWICHING THE FIRST GASKET SEAL BETWEEN THE FIRST COVER AND THE SEALING STEP SURFACE
414

POSITION A SECOND GASKET SEAL COMPOSED OF A SECOND MATERIAL AT LEAST IN PART OVER THE FIRST COVER AND IN CONTACT WITH EACH SIDEWALL OF THE BASE TO FILL ANY GAP BETWEEN THE FIRST COVER AND THE BASE, WHEREIN THE FIRST MATERIAL IS A DIFFERENT MATERIAL THAN THE SECOND MATERIAL
416

FIG. 4B

DUAL GASKET FOR MANUFACTURING OF HERMETICALLY-SEALED HARD DISK DRIVE

FIELD OF EMBODIMENTS

Embodiments of the invention relate generally to the manufacturing of a hermetically-sealed hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air, such as hydrogen, nitrogen, etc., for non-limiting examples, have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

One approach to manufacturing a sealed HDD involves sealing a cover (typically a "second" cover, over a "first" cover) to an HDD enclosure base using laser welding, after various functional tests are completed. However, when using a gasket for the first cover, such gasket needs to block the egress of the helium gas and the ingress of air and moisture vapor during the manufacturing testing, because such testing is performed without the second cover welded over the first cover.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4A is a flow diagram illustrating a method of manufacturing a hermetically-sealed hard disk drive, according to a first embodiment; and FIG. 4B is a flow diagram illustrating a method of manufacturing a hermetically-sealed hard disk drive, according to a second embodiment.

DETAILED DESCRIPTION

Generally, approaches to manufacturing a hermetically-sealed hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

The term "hermetic" will be understood to describe a sealing arrangement designed to have nominally no (or negligible) gaseous leakage or permeation paths. While terms such as "hermetic", "hermetically-sealed", "negligible leakage", "no leakage", etc. may be used herein, note that such a system would often still have a certain amount of permeability and, therefore, not be absolutely leak-free. Hence, the concept of a desired or target "leak rate" may be used herein.

References herein to "an embodiment", "one embodiment", and the like, are intended to mean that the particular feature, structure, or characteristic being described is included in at least one embodiment of the invention. However, instance of such phrases do not necessarily all refer to the same embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Figure 2:
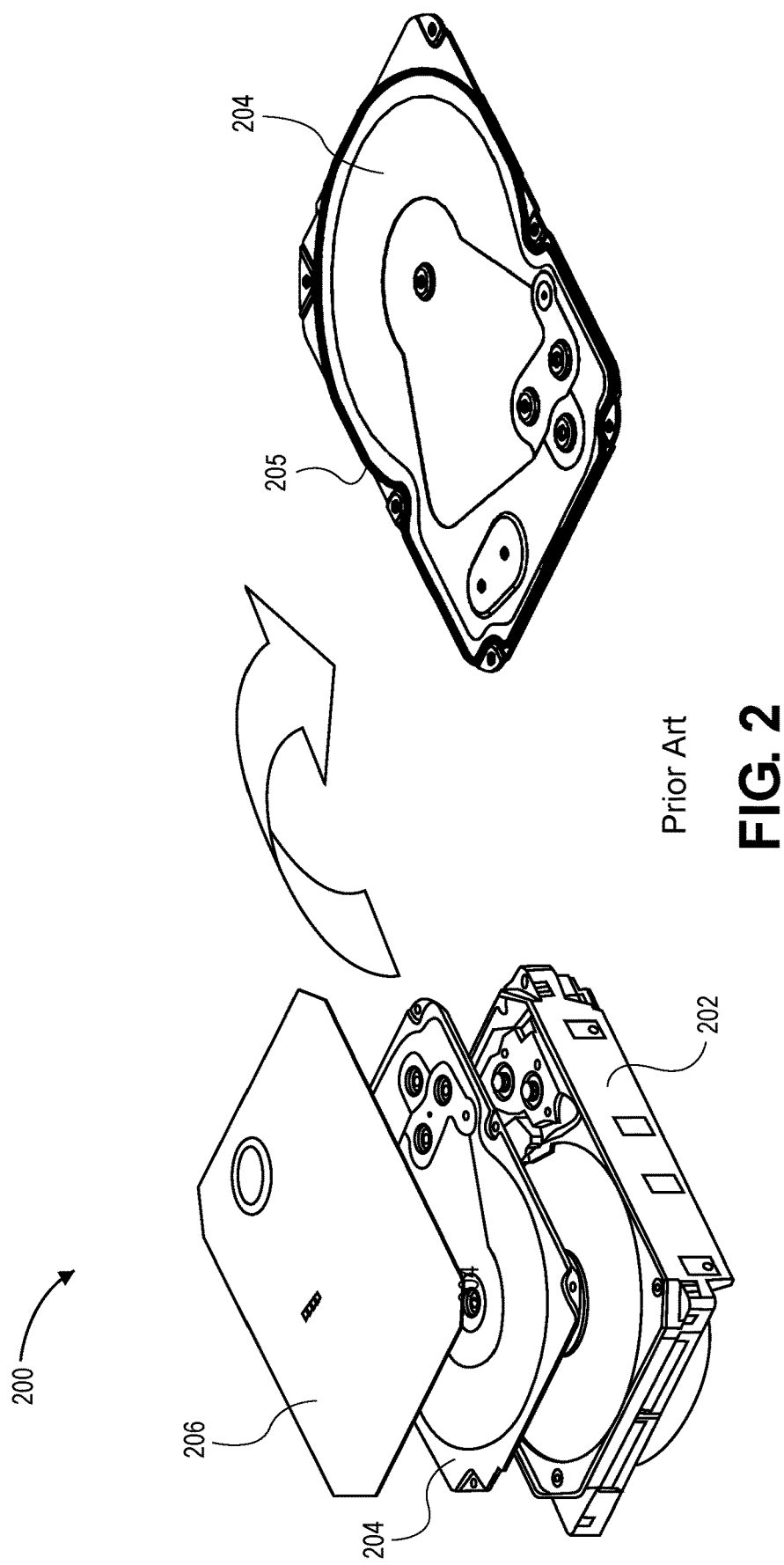
FIG. 2 is an exploded view illustrating a hermetically-sealed hard disk drive and corresponding first cover, according to an embodiment.

FIG. 2 is an exploded view illustrating a hermetically-sealed hard disk drive and corresponding first cover, according to an embodiment. Hermetically-sealed hard disk drive (HDD) 200 comprises an enclosure base 202 (or simply "base 202"), a first cover 204 affixed to the base 202, and a second cover 206 over the first cover 204 and hermetically coupled (e.g., welded) to the base 202. The right side of FIG. 2 illustrates the first cover 204 turned upside down, i.e., illustrating the inside of the first cover 204, and shown comprising a single gasket seal 205. According to an embodiment, the gasket seal 205 is a formed-in-place gasket (FIPG) seal applied to the inside of the first cover 204.

Recall that in the context of a sealed HDD, a first cover gasket such as gasket seal 205 needs to block the transmission of the lighter-than-air gas and any moisture vapor across the sealing barrier during manufacturing testing. Currently, the type of gasket that is used, such as an acrylic type gasket, has a relatively low permeability of helium and water vapor because helium concentration and humidity can have a deleterious effect on the flying height of the read-write head, e.g., the flying height change during the manufacturing testing can affect drive performance. Because the manufacturing test time is increasing over time relative to the increasing storage capacity of HDDs, the current gasket may not be effective enough in avoiding changes to the helium concentration and the humidity in view of such a longer test time. In addition, heat-assisted magnetic recording (HAMR) type HDDs, for example, are especially sensitive to moisture vapor transmission (i.e., ingress) across the interior-exterior interface.

Currently, there is no material known to have both suitably high helium sealing and suitably high water vapor sealing capabilities that can maintain effective sealing during the entire testing timeframe. That is, low helium permeability gaskets typically exhibit relatively high water or moisture transmission and low water vapor transmission gaskets typically exhibit relatively high helium permeability. Developing a material(s) with low helium permeability and low moisture vapor transmission may be considered overly challenging and may result in a material that might not fully work for the intended purpose as a gasket. For example, adding a filler to the gasket material is one possible approach, however this could increase the hardness of the gasket and could cause cover deformation. Use of a temporary sheet aluminum seal with an adhesive backing during manufacturing testing is another possible approach, however there remains challenges with attaching such a seal onto the first cover 204-base 202 edge without wrinkles or bubbles that can cause gas leakage, and adhesive deposits can cause welding errors when welding the second cover 206 onto the base 202. In view of the foregoing, a relatively low cost and re-workable solution for improving on those issues may be desirable.

Dual Gasket Approach to Manufacturing Sealed Hard Disk Drives

Described herein is an approach to blocking helium (or other lighter-than-air gas, such as nitrogen and hydrogen) leakage and moisture vapor using a dual gasket configuration (i.e., two separate independent gaskets) while maintaining re-workability during the manufacturing test process. According to an embodiment, two types of gasket material are used, where each gasket material is either more suited to inhibiting gas egress or to inhibiting moisture ingress, and whereby consideration may be given to use of common materials rather than specialized materials.

Figure 3A:
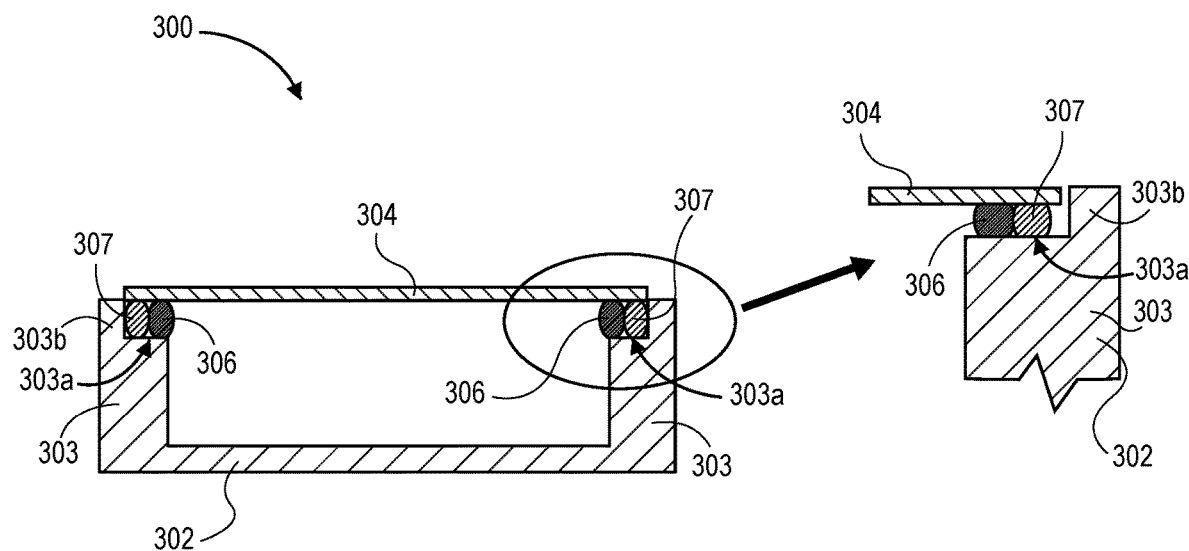
FIG. 3A is a side view illustrating a hermetically-sealed hard disk drive having two gasket seals, according to a first embodiment.

FIG. 3A is a side view illustrating a hermetically-sealed hard disk drive having two gasket seals, according to a first embodiment. Hard disk drive (HDD) 300 comprises an enclosure base 302, a first cover 304 affixed (e.g., fastened with one or more fasteners, such as screws) to the base 302, and at least two adjacent gasket seals 306, 307 sandwiched therebetween. The base 302 includes a plurality of sidewalls 303, each having a sealing step surface 303a surrounded by an outer upper edge portion 303b. According to an embodiment, HDD 300 comprises a first gasket seal 306 composed of a first material and configured and positioned to seal the interface between the first cover 304 and the base 302, and a second gasket seal 307 composed of a second material different from the first material and also configured and positioned to seal the interface between the first cover 304 and the base 302. As such, each of the first gasket seal 306 and the second gasket seal 307 is sandwiched between the first cover 304 and the sealing step surface 303a of each sidewall 303 of the base 302, as depicted. According to an embodiment, the first gasket seal 306 and the second gasket seal 307 are positioned adjacent to one another on or over the sealing step surface 303a. According to a related embodiment, the first gasket seal 306 and the second gasket seal 307 are positioned adjacent to one another on or over the sealing step surface 303a while not in contact with one another, e.g., the gasket seals 306, 307 are not stacked upon one another.

According to an embodiment, the first material of the first gasket seal 306 has a low permeability to a lighter-than-air gas (e.g., helium, or nitrogen or hydrogen) and the second material of the second gasket seal 307 has a low permeability to water (i.e., low water vapor transmission). Gas permeability is typically characterized in terms of a gas permeability coefficient, referring to the amount of gas, by volume, which penetrates unit thickness and area of specimen per unit time, under constant temperature and unit pressure difference when permeation is stable (expressed in terms of $(cm^3)(cm)/(cm^2)(s)(Pa)$, or $cm^3 \cdot cm/cm^3 \cdot s \cdot Ta$). According to an embodiment, the first material preferably has a gas permeability coefficient for helium gas of less than 2000 $cm^3 \cdot mm/(m^2 \cdot 24\ hours \cdot atm)$. Material water vapor permeability is typically characterized in terms of a water vapor permeability coefficient $(P_V)$, referring to the amount of water vapor volume that permeates through unit thickness and area of specimen per unit time, under specified temperature, relative humidity and unit vapor pressure difference (expressed in terms of $(g)(cm)/(cm2)(s)(Pa)$, or $g \cdot cm/cm^2 \cdot s \cdot Ta$. According to an embodiment, the second material preferably has a water vapor permeability coefficient of less than 1.5E-6 $m^3 \cdot mm/(m^2 \cdot 24\ hour \cdot Pa$.

According to an embodiment, the first material of the first gasket seal 306 has a lower permeability to the lighter-than-air gas contained within the HDD 300 than the permeability to the lighter-than-air gas of the second material of the second gasket seal 307, and the second material of the second gasket seal 307 has a lower water vapor transmission than the water vapor transmission of the first material of the first gasket seal 306. Thus, according to the embodiment in which the first gasket seal 306 and the second gasket seal 307 are positioned adjacent to one another on or over the sealing step surface 303a while not in contact with one another, each gasket seal 306, 307 is intended to function and does indeed function relatively or conceptually independent of the other, e.g., first gasket seal 306 functions primarily to inhibit gas leakage or gas egress from the HDD 300 while the second gasket seal 307 functions primarily to inhibit water vapor or moisture ingress into the HDD 300. However, that is not to say that the first gasket seal 306 is completely devoid of any water vapor transmission inhibition attributes and/or that the second gasket seal 307 is completely devoid of any gas leakage inhibition attributes. Also note that reversal of the respective roles of the first gasket seal 306 and the second gasket seal 307 is considered and is within the scope of the embodiments, e.g., the first gasket seal 306 may be employed for inhibiting water vapor or moisture ingress into the HDD 300 and the second gasket seal 307 may be employed for inhibiting gas leakage or gas egress from the HDD 300.

Figure 3B:
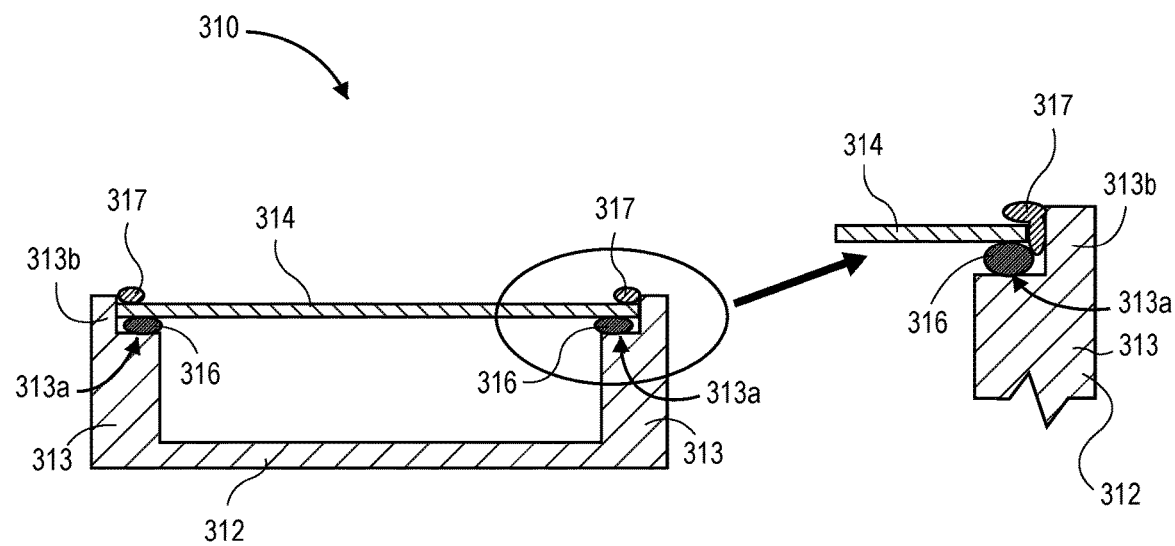
FIG. 3B is a side view illustrating a hermetically-sealed hard disk drive having two gasket seals, according to a second embodiment.

FIG. 3B is a side view illustrating a hermetically-sealed hard disk drive having two gasket seals, according to a second embodiment. Hard disk drive (HDD) 310 comprises an enclosure base 312, a first cover 314 affixed (e.g., fastened with one or more fasteners, such as screws) to the base 312, and at least two gasket seals 316, 317. The base 312 includes a plurality of sidewalls 313, each having a sealing step surface 313a surrounded by an outer upper edge portion 313b. According to an embodiment, HDD 310 comprises a first gasket seal 316 composed of a first material and configured and positioned to seal the interface between the first cover 314 and the base 312, and a second gasket seal 317 composed of a second material different from the first material and also configured and positioned to seal the interface between the first cover 314 and the base 312. As such, the first gasket seal 316 is sandwiched between the first cover 314 and the sealing step surface 313a of each sidewall 313 of the base 312, and the second gasket seal 317 is positioned at least in part over the first cover 314 and in contact with each outer upper edge portion 313b of the base 312, to at least partially fill any gap between the first cover 314 and the base 312, as depicted. Here, the second gasket seal 317 can be applied to the outside of the first cover 314 before the manufacturing testing procedures.

Similar to the embodiment illustrated and described in reference to FIG. 3A, and according to an embodiment, the first material of the first gasket seal 316 has a low permeability to a lighter-than-air gas (e.g., helium, or nitrogen or hydrogen) and the second material of the second gasket seal 307 has a low permeability to water (i.e., low water vapor transmission). According to an embodiment, the first material of the first gasket seal 316 has a lower permeability to the lighter-than-air gas contained within the HDD 310 than the permeability to the lighter-than-air gas of the second material of the second gasket seal 317, and the second material of the second gasket seal 317 has a lower water vapor transmission than the water vapor transmission of the first material of the first gasket seal 316. Thus, each gasket seal 316, 317 is intended to function and does indeed function relatively or conceptually independent of the other, e.g., first gasket seal 316 functions primarily to inhibit gas leakage or gas egress from the HDD 310 while the second gasket seal 317 functions primarily to inhibit water vapor or moisture ingress into the HDD 310. Again, that is not to say that the first gasket seal 316 is completely devoid of any water vapor transmission inhibition attributes and/or that the second gasket seal 317 is completely devoid of any gas leakage inhibition attributes. Here too the reversal of the respective roles of the first gasket seal 316 and the second gasket seal 317 is considered and is within the scope of the embodiments, e.g., the first gasket seal 316 may be employed for inhibiting water vapor or moisture ingress into the HDD 310 and the second gasket seal 317 may be employed for inhibiting gas leakage or gas egress from the HDD 310.

Generally, a liquid gasket or releasable adhesive may be used for the second gasket seal 317, instead of a FIPG (form-in-place gasket) type gasket, and which is easy to apply in the process without special tools and is easy to remove and re-work if the drive fails any test. Thus, according to an embodiment a releasable material (for example, a "releasable adhesive" or "liquid gasket") is utilized for the second gasket seal 317, for ease of removal of the second gasket seal 317 before affixing of the second cover (see, e.g., second cover 206 of FIG. 2) if desired. Generally, the material selected for the liquid gasket/releasable adhesive second gasket seal 317 is a liquid material of relatively high viscosity, such that it is relatively simple to apply over the first cover 314 and can readily fill the gap between the first cover 314 and the outer upper edge portion 313b of the base 312. Such a material becomes harder after curing, whereby the cured liquid gasket/releasable adhesive material for the second gasket seal 317 is relatively easy to remove after manufacturing testing. For non-limiting examples, an ultraviolet (UV)-curing type acrylic gasket may be implemented, or an acrylic gasket cured at room temperature or lower temperature may be implemented. Here, use of a low water vapor transmission liquid gasket/releasable adhesive is preferred for the second gasket seal 317, however the roles of the respective gasket seals 316, 317 again may be reversed.

For a non-limiting example of materials that may be currently available, a double-sided peelable adhesive from Cemedine Co., Ltd. (e.g., BBX100) may be used, which is a repairable seal material that is advertised as bonding immediately after application, and can be easily peeled off, and has both waterproofness and impact resistance. For another non-limiting example, a silicone liquid gasket from ThreeBond Holdings Co., Ltd (e.g., No. 8) may be used, which is a substance that is fluid at room temperature and dries or becomes uniform after a certain period of time to form an elastic film or thin adhesive layer that is advertised as oil-tight, water-tight, and air-tight to prevent leakage along with a pressure resistance functionality. For yet another non-limiting example, a liquid rubber from Kuraray Co., Ltd. (e.g., K-LR) may be used, a group of high-viscosity synthetic rubbers some of which are based on isoprene, butadiene and styrene.

Methods of Manufacturing Hermetically-Sealed Hard Disk Drive

FIG. 4A is a flow diagram illustrating a method of manufacturing a hermetically-sealed hard disk drive, according to a first embodiment. The method of FIG. 4A may be used to manufacture the dual-gasket HDD illustrated and described herein in reference to FIG. 3A, and equivalents and variants thereof.

At block 402, a first gasket seal composed of a first material is positioned over a sealing step surface of sidewalls of an enclosure base. For example, first gasket seal 306 is positioned over the sealing step surface 303a of each sidewall 303 of the base 302. For example, an FIPG type of gasket may be applied to the first cover 304 and utilized as the first gasket seal 306 (see, e.g., gasket seal 205 of FIG. 2), in the context of positioning the first cover 304 over the base 302.

At block 404, a second gasket seal composed of a second material is positioned over the sealing step surface adjacent to the first gasket seal, wherein the first material is a different material than the second material. For example, second gasket seal 307 is positioned over the sealing step surface 303a of each sidewall 303 of the base 302. Here too an FIPG type of gasket may be applied to the first cover 304 and utilized as the second gasket seal 307 (see, e.g., gasket seal 205 of FIG. 2), in the context of positioning the first cover 304 over the base 302. As described elsewhere herein, the first material of the first gasket seal 306 has a low permeability to a lighter-than-air gas (e.g., helium, or nitrogen or hydrogen) and the second material of the second gasket seal 307 has a low permeability to water (i.e., low water vapor transmission). This arrangement may be implemented such that the first material of the first gasket seal 306 has a lower permeability to the lighter-than-air gas contained within the HDD 300 than the permeability to the lighter-than-air gas of the second material of the second gasket seal 307, and the second material of the second gasket seal 307 has a lower water vapor transmission than the water vapor transmission of the first material of the first gasket seal 306.

At block 406, a first cover is affixed to the base, thereby sandwiching (e.g., compressing) the first gasket seal and the second gasket seal between the first cover and the sealing step surface. For example, the first cover 304 is affixed to the base 302, thereby sandwiching the first gasket seal 306 and the second gasket seal 307 between the first cover 304 and the sealing step surface 303a of the sidewalls 303 of the base 302. Hence, manufacturing testing may then be performed on the HDD, e.g., prior to "permanently" affixing (e.g., welding) a second cover (see, e.g., second cover 206 of FIG. 2) to the base 302 over the first cover 304.

FIG. 4B is a flow diagram illustrating a method of manufacturing a hermetically-sealed hard disk drive, according to a second embodiment. The method of FIG. 4B may be used to manufacture the dual-gasket HDD illustrated and described herein in reference to FIG. 3B, and equivalents and variants thereof.

At block 412, a first gasket seal composed of a first material is positioned over a sealing step surface of sidewalls of an enclosure base. For example, first gasket seal 316 is positioned over the sealing step surface 313a of each sidewall 313 of the base 312. For example, an FIPG type of gasket may be applied to the first cover 314 and utilized as the first gasket seal 316 (see, e.g., gasket seal 205 of FIG. 2), upon positioning the first cover 314 over the base 312.

At block 414, a first cover is affixed to the base, thereby sandwiching (e.g., compressing) the first gasket seal between the first cover and the sealing step surface. For example, the first cover 314 is affixed to the base 312, thereby sandwiching the first gasket seal 316 between the first cover 314 and the sealing step surface 313a of the sidewalls 313 of the base 312.

At block 416, a second gasket seal composed of a second material is positioned at least in part over the first cover and in contact with each sidewall of the base, thereby filling any gap between the first cover and the base, wherein the first material is a different material than the second material. For example, second gasket seal 317 is positioned at least in part over the first cover 314 and in contact with each outer upper edge portion 313b of the base 312, to at least partially fill any gap between the first cover 314 and the base 312. As described elsewhere herein, the first material of the first gasket seal 316 has a low permeability to a lighter-than-air gas (e.g., helium, or nitrogen or hydrogen) and the second material of the second gasket seal 317 has a low permeability to water (i.e., low water vapor transmission). This arrangement may be implemented such that the first material of the first gasket seal 316 has a lower permeability to the lighter-than-air gas contained within the HDD 310 than the permeability to the lighter-than-air gas of the second material of the second gasket seal 317, and the second material of the second gasket seal 317 has a lower water vapor transmission than the water vapor transmission of the first material of the first gasket seal 316. Once again, manufacturing testing may then be performed on the HDD, and the second gasket seal 317 removed if desired, e.g., prior to "permanently" affixing a second cover (see, e.g., second cover 206 of FIG. 2) over the first cover 314 to the base 312.

Thus, with implementation of the approaches described and illustrated herein, an HDD is provided which has low helium and moisture vapor transmission during the manufacturing testing procedure, at a relatively low cost and with suitable or improved reworkability. By utilizing two separate independent gaskets which have low helium permeability and low moisture vapor transmission, respectively, helium concentration in the HDD is kept high and humidity in the HDD is kept low during manufacturing testing and degradation of the HDD performance by the change of flying height is ultimately avoided.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
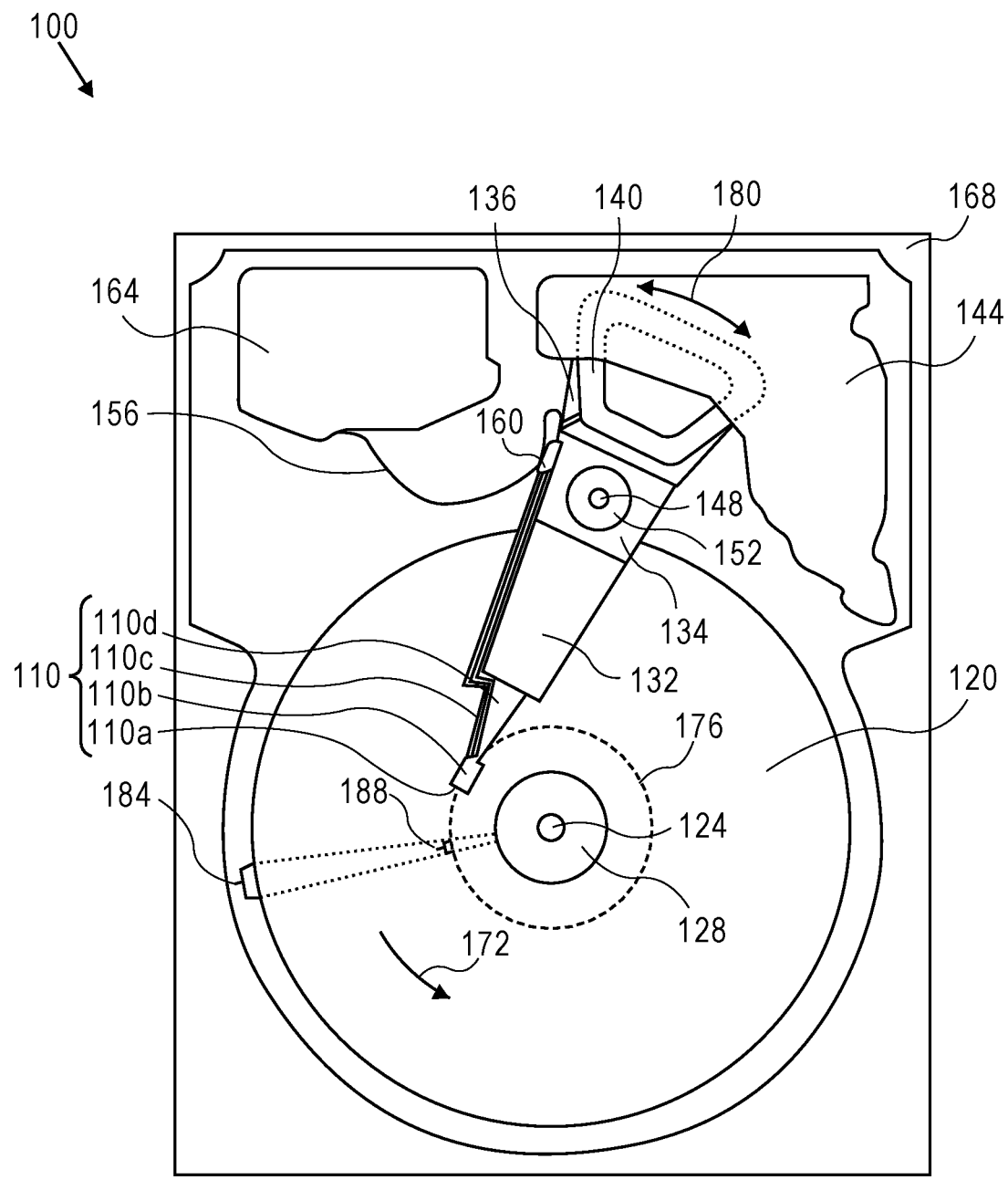
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hermetically-sealed hard disk drive comprising:
   an enclosure base having a plurality of sidewalls each having a sealing step surface surrounded by an outer upper edge portion;
   a first cover coupled to the base;
   a first gasket seal composed of a first material and configured to seal an interface between the first cover and the base; and
   a second gasket seal composed of a second material and configured to seal the interface between the first cover and the base;
   wherein:
   the first material is a different material than the second material;
   the first material has a lower permeability to a lighter-than-air gas contained within the hard disk drive than the permeability to the lighter-than-air gas of the second material, whereby the first material has a gas permeability coefficient for helium gas of less than 2000 $cm^3 \cdot mm/(m^2 \cdot 24\ hours \cdot atm)$; and
   the second material has a lower water vapor transmission than the water vapor transmission of the first material, whereby the second material has a water vapor permeability coefficient of less than 1.5E-6 $m^3 \cdot mm/(m^2 \cdot 24\ hours \cdot Pa)$.

2. The hermetically-sealed hard disk drive of claim 1, wherein the lighter-than-air gas comprises helium.

3. The hermetically-sealed hard disk drive of claim 1, wherein the lighter-than-air gas comprises nitrogen or hydrogen.

4. The hermetically-sealed hard disk drive of claim 1, wherein:
   the first gasket seal is sandwiched between the first cover and the sealing step surface of each sidewall of the base.

5. The hermetically-sealed hard disk drive of claim 4, wherein:
   the second gasket seal is sandwiched between the first cover and the sealing step surface of each sidewall of the base.

6. The hermetically-sealed hard disk drive of claim 5, wherein:
   the second gasket seal is positioned adjacent to the first gasket seal.

7. The hermetically-sealed hard disk drive of claim 4, wherein:
   the second gasket seal is positioned at least in part over the first cover and in contact with each outer upper edge portion of the base to at least partially fill any gap between the first cover and the base.

8. The hermetically-sealed hard disk drive of claim 5, wherein:
   the second gasket seal is positioned adjacent to and not in contact with the first gasket seal.

9. The hermetically-sealed hard disk drive of claim 1, wherein:
   the second gasket seal is positioned at least in part over the first cover and in contact with each outer upper edge portion of the base to at least partially fill any gap between the first cover and the base;
   the second material is composed of a liquid releasable-adhesive material.

10. The hermetically-sealed hard disk drive of claim 1, further comprising:
    a second cover positioned over the first cover and hermetically-sealed to the base.

11. A method of manufacturing a hermetically-sealed hard disk drive, the method comprising:
    positioning a first gasket seal composed of a first material over a sealing step surface of sidewalls of an enclosure base;
    positioning a second gasket seal composed of a second material over the sealing step surface adjacent to the first gasket seal; and
    affixing a first cover to the base, thereby sandwiching the first gasket seal and the second gasket seal between the first cover and the sealing step surface;
    wherein:
    the first material is a different material than the second material;
    the first material has a lower permeability to a lighter-than-air gas contained within the hard disk drive than the permeability to the lighter-than-air gas of the second material, whereby the first material has a gas permeability coefficient for helium gas of less than 2000 $cm^3 \cdot mm/(m^2 \cdot 24\ hours \cdot atm)$; and
    the second material has a lower water vapor transmission than the water vapor transmission of the first material, whereby the second material has a water vapor permeability coefficient of less than 1.5E-6 $m^3 \cdot mm/(m^2 \cdot 24\ hours \cdot Pa)$.

12. A method of manufacturing a hermetically-sealed hard disk drive, the method comprising:
    positioning a first gasket seal composed of a first material over a sealing step surface of sidewalls of an enclosure base;
    affixing a first cover to the base, thereby sandwiching the first gasket seal between the first cover and the sealing step surface;
    positioning a second gasket seal composed of a second material at least in part over the first cover and in contact with each sidewall of the base to fill any gap between the first cover and the base; and
    wherein:
    the first material is a different material than the second material;
    the first material has a lower permeability to a lighter-than-air gas contained within the hard disk drive than the permeability to the lighter-than-air gas of the second material, whereby the first material has a gas permeability coefficient for helium gas of less than 2000 $cm^3 \cdot mm/(m^2 \cdot 24\ hours \cdot atm)$; and
    the second material has a lower water vapor transmission than the water vapor transmission of the first material, whereby the second material has a water vapor permeability coefficient of less than 1.5E-6 $m^3 \cdot mm/(m^2 \cdot 24\ hours \cdot Pa)$.

13. The method of claim 12, wherein the second material is composed of a liquid releasable-adhesive material.

14. A hermetically-sealed hard-disk drive comprising:
    a disk medium rotatably mounted on a spindle;
    a head slider housing a read-write transducer configured to read from and to write to the disk medium;
    an actuator configured to move the head slider to access portions of the disk medium;
    an enclosure base;
    a first cover coupled to the base;
    first means for sealing composed of a first material having a lower permeability to a lighter-than-air gas contained within the hard disk drive than the permeability to the lighter-than-air gas of a second material, and positioned to seal the first cover and the base; and second means for sealing composed of the second material having a lower water vapor transmission than the water vapor transmission of the first material, and positioned to seal the first cover and the base.

15. The hermetically-sealed hard disk drive of claim 14, wherein:

the first means for sealing is sandwiched between the first cover and a sealing step surface of each of a plurality of sidewalls of the base.

16. A hermetically-sealed hard disk drive comprising:

an enclosure base having a plurality of sidewalls each having a sealing step surface surrounded by an outer upper edge portion;

a first cover coupled to the base;

a first gasket seal composed of a first material and sandwiched between the first cover and the sealing step surface of each sidewall of the base to seal an interface between the first cover and the base; and a second gasket seal composed of a second material sandwiched between the first cover and the sealing step surface of each sidewall of the base to seal the interface between the first cover and the base;

wherein:

the first material is a different material than the second material;

the first material has a lower permeability to a lighter-than-air gas contained within the hard disk drive than the permeability to the lighter-than-air gas of the second material, whereby the first material has a gas permeability coefficient for helium gas of less than 2000 $cm^3 \cdot mm/(m^2 \cdot 24 \text{ hours} \cdot atm)$, and the second material has a lower water vapor transmission than the water vapor transmission of the first material, whereby the second material has a water vapor permeability coefficient of less than 1.5E-6 $m^3 \cdot mm/(m^2 \cdot 24 \text{ hours} \cdot Pa)$.

* * * * *